United States Patent
Karakawa et al.

(12)

(10) Patent No.: US 6,765,849 B2
(45) Date of Patent: Jul. 20, 2004

(54) METHOD AND APPARATUS FOR REPRODUCING DATA FROM A RECORDING MEDIUM USING LIGHT BEAM WITH ADJUSTABLE POWER

(75) Inventors: Yuji Karakawa, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 09/961,974

(22) Filed: Sep. 24, 2001

(65) Prior Publication Data

US 2002/0181354 A1 Dec. 5, 2002

(30) Foreign Application Priority Data

May 30, 2001 (JP) ........................................ 2001-163256

(51) Int. Cl.⁷ ................................................ G11B 7/00
(52) U.S. Cl. .................................. 369/47.5; 369/53.62
(58) Field of Search .......................... 369/47.5, 47.51, 369/53.26

(56) References Cited

U.S. PATENT DOCUMENTS

| | | | |
|---|---|---|---|
| 5,309,461 A | * 5/1994 | Call et al. ................. | 372/38.09 |
| 5,414,692 A | * 5/1995 | Aoki ......................... | 369/275.3 |
| 5,539,720 A | * 7/1996 | Aoi ............................ | 369/116 |
| 5,732,055 A |   3/1998 | Masaki et al. ................ | 369/54 |
| 5,798,992 A | * 8/1998 | Kaneko et al. ............ | 369/53.26 |
| 5,822,346 A | * 10/1998 | Arai ......................... | 372/38.04 |
| 6,067,284 A |   5/2000 | Ikeda et al. ................. | 369/116 |
| 6,115,338 A |   9/2000 | Masaki et al. ................ | 369/54 |
| 6,144,628 A |  11/2000 | Matsuura ....................... | 369/58 |
| 6,144,680 A | * 11/2000 | Kaji et al. .................... | 372/38 |
| 6,172,947 B1 | * 1/2001 | Senshu ..................... | 369/53.35 |
| 6,246,659 B1 | * 6/2001 | Suzuki et al. ............... | 369/116 |

FOREIGN PATENT DOCUMENTS

JP         6-076406         3/1994

* cited by examiner

*Primary Examiner*—Aristotelis M. Psitos
(74) *Attorney, Agent, or Firm*—Greer, Burns & Crain, Ltd.

(57) ABSTRACT

A storage apparatus uses a light beam to reproduce information from a recording medium having an information region with a recording format which includes a header including position information and a recording field including a data field for recording data. The storage apparatus is provided with a light source for emitting the light beam, and a control section for controlling a power L2 of the light beam in a vicinity of a start of the recording field to become higher than a power L3 at the data field of the recording field.

20 Claims, 17 Drawing Sheets

METHOD AND APPARATUS FOR REPRODUCING DATA FROM A RECORDING MEDIUM USING LIGHT BEAM WITH ADJUSTABLE POWER

BACKGROUND OF THE INVENTION

This application claims the benefit of a Japanese Patent Application No. 2001-163256 filed May 30, 2001, in the Japanese Patent Office, the disclosure of which is hereby incorporated by reference.

1. Field of the Invention

The present invention generally relates to reproducing methods and storage apparatuses, and more particularly to a reproducing method for reproducing information from a recording medium such as a magneto-optical disk, and to a storage apparatus which employs such a reproducing method.

2. Description of the Related Art

Of various magneto-optical disk units, there is a magneto-optical disk unit which reproduces information from a magneto-optical disk employing Magnetic Super Resolution (MSR), by a so-called double mask Rear Aperture Detection (RAD). The magneto-optical disk employing MSR will hereinafter simply be referred to as a MSR disk. According to the double mask RAD, heat and magnetic field applied on the MSR disk are controlled to eliminate interference of information recorded before and after along a track direction, so as to improve the recording density.

In each zone on the MSR disk other than a control zone in which control information is recorded as variations in geometrical configuration such as pits, information is recorded with a recording format which includes a header and a recording field. The header includes a sector mark which indicates a start of a sector, a VFO field for PLL phase synchronization and AGC, an address mark for synchronizing to a following ID portion, the ID portion which includes information for recognizing a sector address, and the like. The header is recorded as variations in geometrical configuration such as concave or convex pits. On the other hand, the recording field includes a gap portion which indicates a start of the recording field, a VFO field for PLL phase synchronization and AGC, a synchronizing portion for synchronizing to data, a data field for recording data, and the like. The recording field is recorded magneto-optically.

According to a conventional magneto-optical disk unit, when the reproduction of the ID portion of the header ends, a power (hereinafter referred to as an LD power) of a light beam which is emitted from a light source such as a laser diode (LD) and is irradiated on the MSR disk is increased to an LD power which is capable of reproducing the data field of the recording field, and the reproduction is continued at the increased LD power, as shown in FIG. 1. In FIG. 1, (a) indicates the LD power, and (b) indicates the ID portion of the header and the data field of the recording field in the zone.

However, a hysteresis relationship shown in FIG. 2 exists between the mask and the heat which is required to form the mask. In FIG. 2, the ordinate indicates a region where the mask is formed and a region where no mask is formed, and the abscissa indicates the LD power at the time of the reproduction. For this reason, the present inventors have newly discovered that the LD power which is required to reproduce the data of the data field at the start of the reproduction is higher than the LD power which is required to continue reproducing the data of the data field.

In other words, although the LD power immediately after the reproduction of the data of the data field is started may be lower than the LD power which is required to reproduce the data of the data field at the start of the reproduction, the conventional magneto-optical disk unit continues to reproduce the data of the data field using the high LD power. Consequently, the present inventors have newly discovered that a range of the LD power in which the reproduction can be carried out is small, that is, a margin of the LD power at the time of the reproduction is small.

SUMMARY OF THE INVENTION

Accordingly, it is a general object of the present invention to provide a novel and useful reproducing method and storage apparatus, in which the problems described above are eliminated.

Another and more specific object of the present invention is to provide a reproducing method and a storage apparatus which can realize a high-density recording and reproduction by increasing the margin of the LD power at the time of the reproduction.

Still another object of the present invention is to provide a reproducing method which uses a light beam to reproduce information from a recording medium having an information region with a recording format which includes a header including position information and a recording field including a data field for recording data, comprising the step of (a) controlling a power L2 of the light beam in a vicinity of a start of the recording field to become higher than a power L3 at the data field of the recording field. According to the reproducing method of the present invention, it is possible to realize a high-density recording and reproduction by increasing the margin of the power of the light beam at the time of the reproduction, and make it possible to realize a highly reliable reproducing method which can sufficiently reproduce information even when the power slightly deviates from an optimum value due to effects of environmental changes or the like.

A further object of the present invention is to provide a storage apparatus which uses a light beam to reproduce information from a recording medium having an information region with a recording format which includes a header including position information and a recording field including a data field for recording data, comprising a light source for emitting the light beam, and control means for controlling a power L2 of the light beam in a vicinity of a start of the recording field to become higher than a power L3 at the data field of the recording field. According to the storage apparatus of the present invention, it is possible to realize a high-density recording and reproduction by increasing the margin of the power of the light beam at the time of the reproduction, and make it possible to realize a highly reliable storage apparatus which can sufficiently reproduce information even when the power slightly deviates from an optimum value due to effects of environmental changes or the like.

Other objects and further features of the present invention will be apparent from the following detailed description when read in conjunction with the accompanying drawings.

DESCRIPTION OF THE PREFERRED EMBODIMENTS

A description will be given of embodiments of a reproducing method according to the present invention and a storage apparatus according to the present invention, by referring to FIGS. 3 through 18.

Figure 1:
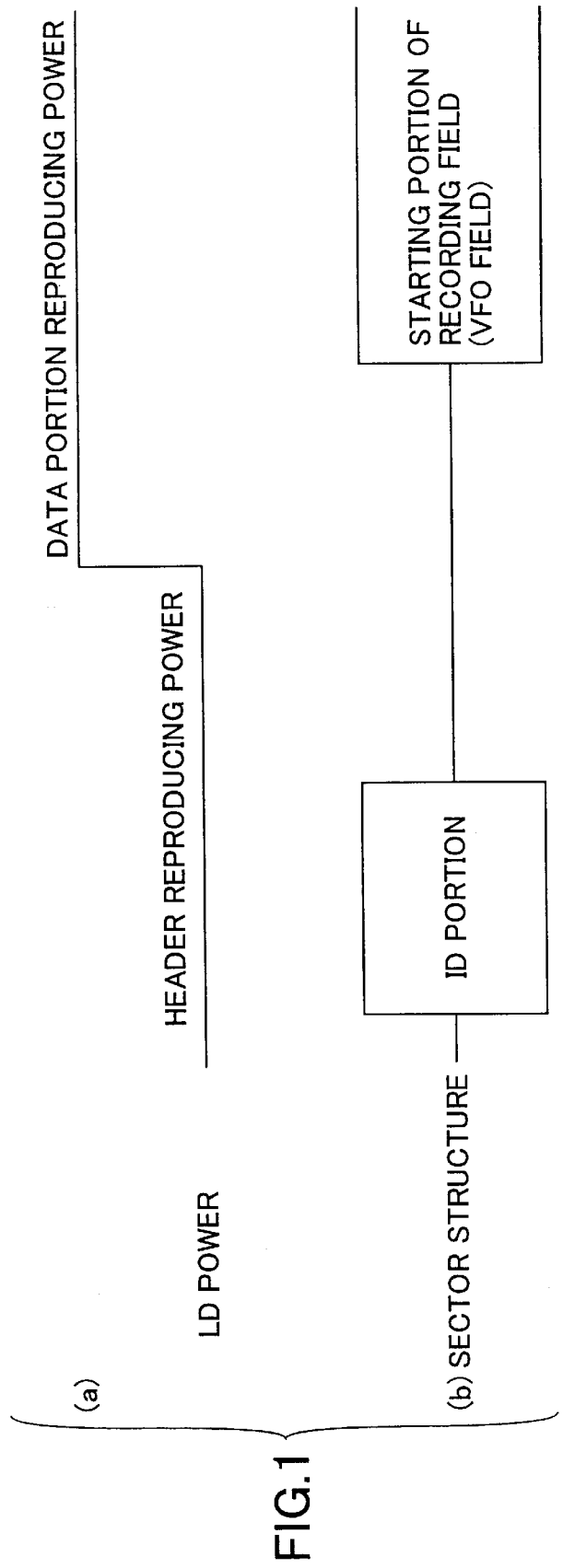
FIG. 1 is a diagram for explaining a LD power at the time of a reproduction in a conventional magneto-optical disk unit.
Figure 2:
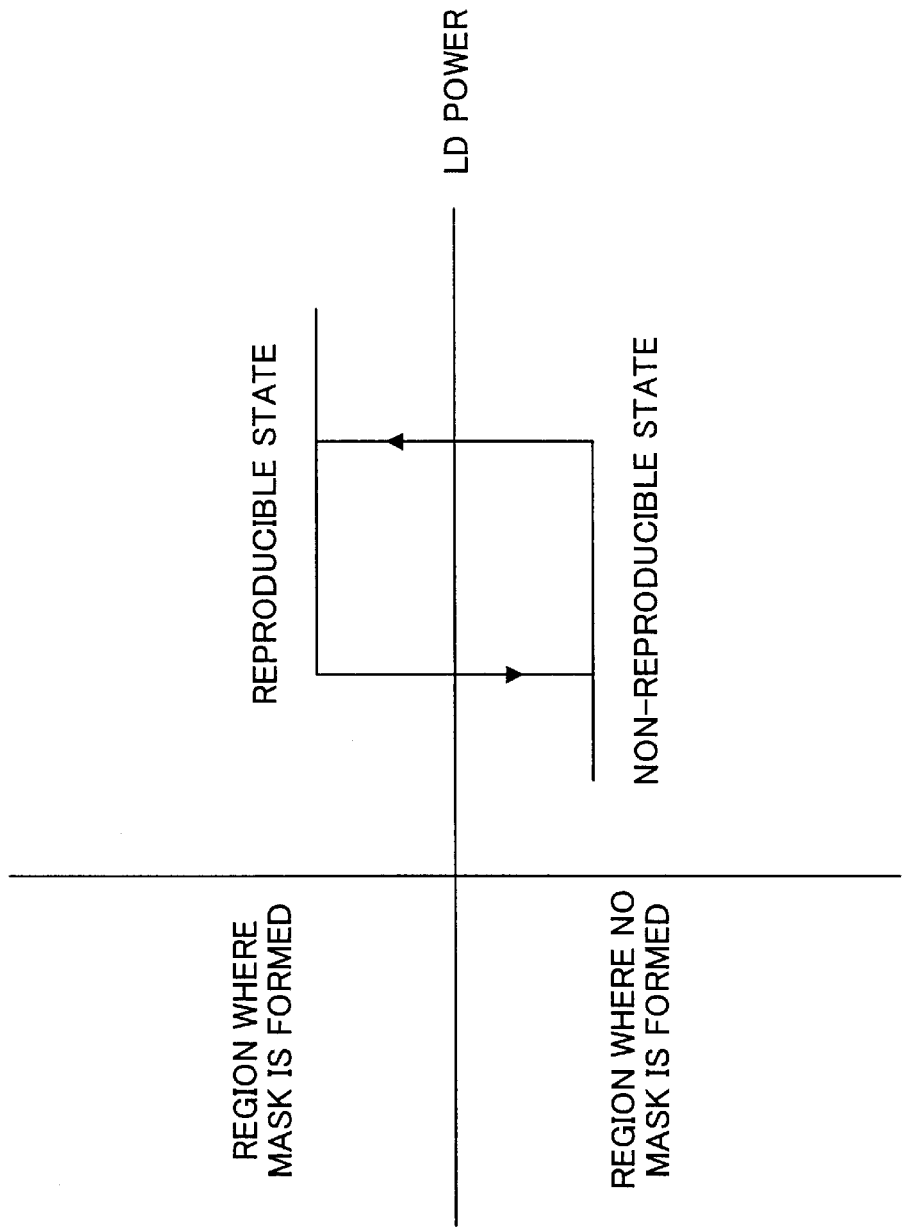
FIG. 2 is a diagram showing a relationship between a mask and heat which is required to form the mask.
Figure 3:
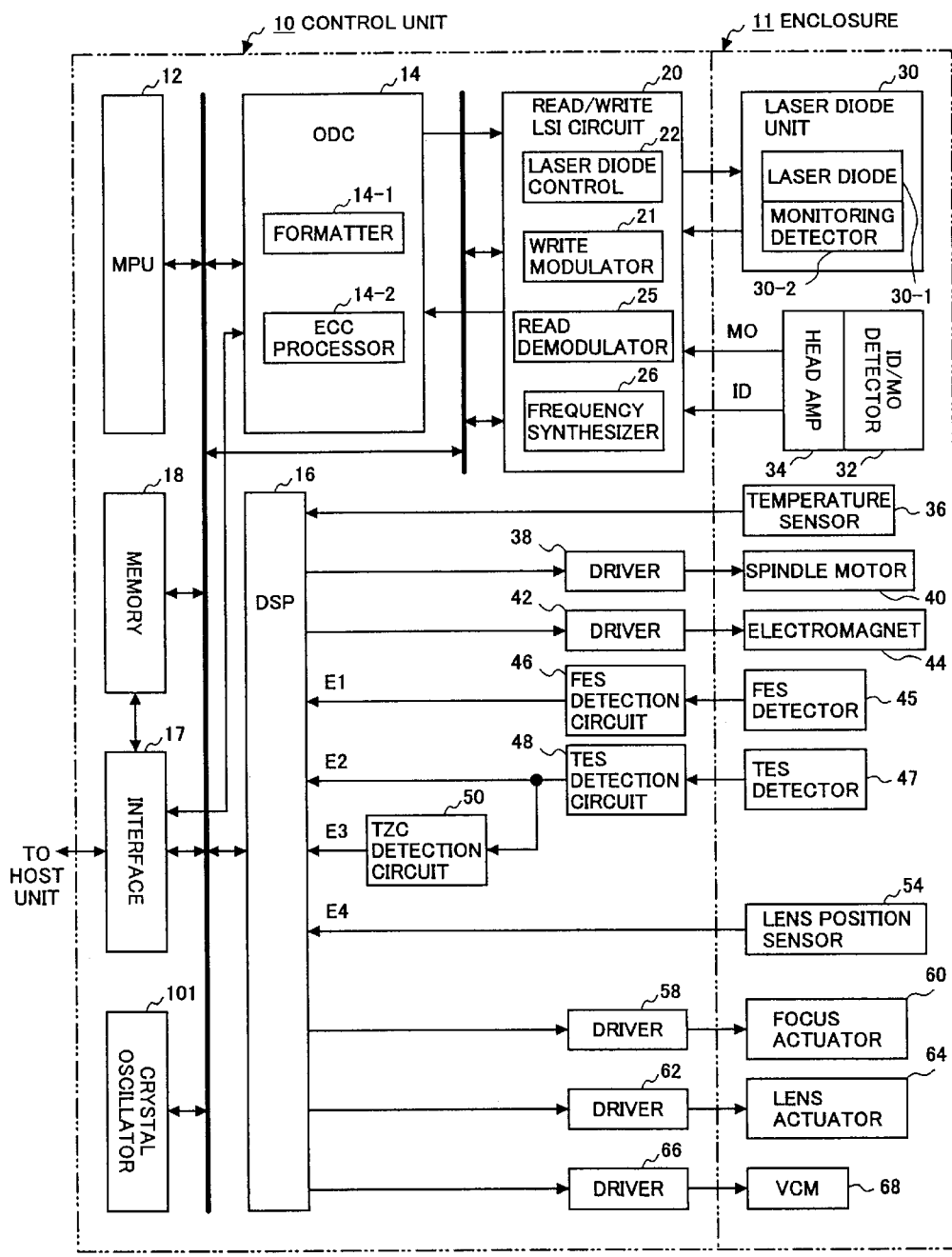
FIG. 3 is a system block diagram showing a structure o a first embodiment of a storage apparatus according to the present invention.

First, a description will be given of a first embodiment of the storage apparatus according to the present invention, by referring to FIGS. 3 and 7. FIG. 3 is a system block diagram showing the structure of this first embodiment of the storage apparatus. In this first embodiment of the storage apparatus, the present invention is applied to an optical disk unit. In addition, this first embodiment of the storage apparatus employs a first embodiment of the reproducing method according to the present invention.

As shown in FIG. 3, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read and write data with respect to an optical disk (not shown), a digital signal processor (DSP) 16, and a memory 18. The memory 18 is used in common by the MPU 12, the ODC 14 and the interface 14, and for example, includes a dynamic random access memory (DRAM), a nonvolatile memory which stores control programs and flag information, or the like. A crystal oscillator 101 is coupled to the MPU 12.

The ODC 14 includes a formatter 14-1 and an error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 14-2. Further, the NRZ data in sector units are connected in the formatter 14-1 so as to transfer a NRZ read data stream to the host unit.

A read/write large scale integrated (LSI) circuit 20 is provided with respect to the ODC 14. This read/write LSI circuit 20 includes a write modulator 21, a laser diode control circuit 22, a read demodulator 25 and a frequency synthesizer 26. A control output of the laser diode control circuit is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk using the laser diode unit 30, this embodiment uses a writable magneto-optical (MO) cartridge medium employing the PWM recording which records the data in correspondence with the existence of mark edges on the optical disk. In addition, the recording format used by the optical disk is a 2.3 GB format using magnetic super resolution (MSR) and the ZCAV system. When the optical disk is loaded into the optical disk unit, an identification (ID) portion of the optical disk is first read, so as to recognize the type (storage capacity and the like) of the optical disk in the MPU 12 based on pit intervals of the ID portion. The MPU 12 notifies the recognition result indicating the type of optical disk to the ODC 14. For example, the type which is recognized may include information that the optical disk is a 3.5-inch disk and has a storage capacity of 128 MB, 230 MB, 540/640 MB, 1.3 GB or 2.3 GB.

The read/write LSI circuit 20 is also provided as a read system with respect to the ODC 14. The read demodulator 25 and the frequency synthesizer 26 are provided in the read/write LSI circuit 20, as described above. An ID/MO detector of the enclosure 11 detects a laser beam emitted from the laser diode 30-1 and returned via the optical disk, and a detection signal from this ID/MO detector 32 is input as an ID signal (embossed pit signal) and a MO signal to the read/write LSI circuit 20 via a head amplifier 34.

The read demodulator 25 of the read/write LSI circuit 20 includes the functions of circuits such as an automatic gain control (AGC) circuit, a filter and a sector mark detection circuit. Hence, the read demodulator 25 generates a read clock and read data from the input ID signal and MO signal, and demodulates the PWM data back into the original NRZ data. In addition, since the ZCAV system is employed, the MPU 12 controls a setting of a frequency dividing ratio with respect to the frequency synthesizer 26 of the read/write LSI circuit 20 in order to generate a clock frequency in correspondence with the zone.

The frequency synthesizer 26 is a phase locked loop (PLL) circuit having a programmable frequency divider, and generates as a read clock a reproducing reference clock having a predetermined specific frequency depending on the zone position on the optical disk. In other words, the frequency synthesizer 26 is formed by the PLL circuit having the programmable frequency divider, and in a normal mode, generates the recording and/or reproducing reference clock having a frequency fo based on fo=(m/n)fi according to a frequency dividing ratio m/n which is set by the MPU 12 depending on a zone number.

A denominator n of the frequency dividing ratio m/n is a specific value depending on the type of optical disk. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a recording and/or reproducing reference clock frequency generated outside the frequency synthesizer 26.

The read data demodulated in the read/write LSI circuit 20 is supplied to the read system of the ODC 14, and after carrying out the reverse conversion of the 1–7 RLL, the CRC and the ECC processes are carried out by the encoding function of the ECC processor 14-2 so as to restore the original NRZ data. Next, the formatter 14-1 connects and converts the NRZ sector data into the NRZ data stream, and this NRZ read data stream is transferred to the host unit via the memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22 to optimum values.

The MPU 12 controls a spindle motor 40 provided in the enclosure 11 via the DSP 16 and a driver 38. In this embodiment, since the ZCAV system is employed as the recording format of the optical disk, the spindle motor 40 is rotated at a constant speed of 3637 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure. In the case of the optical disk having the 1.3 GB or 2.3 GB format employing the MSR, the electromagnet 44 also supplies the external magnetic field on the optical disk at the time of the MSR reproduction.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk. A FES detection circuit 46 generates a FES E1 from a detection signal received from the FES detector 45, and inputs this FES E1 to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 54 is provided in the enclosure 11. This lens position sensor 54 detects a position of an object lens through which the laser beam is irradiated on the optical disk. A lens position detection signal (LPOS) E4 from the lens position sensor 54 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 4:
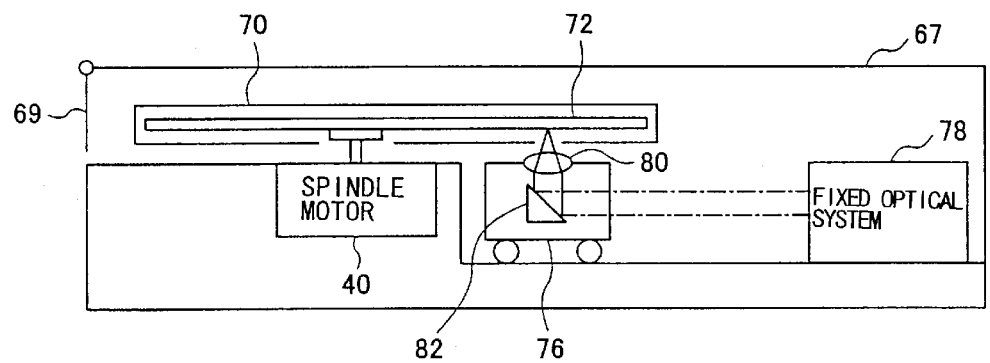
FIG. 4 is a cross sectional view showing a general structure of an enclosure.

FIG. 4 is a cross sectional view showing the general construction of the enclosure 11. As shown in FIG. 4, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk with respect to the optical disk unit.

A carriage 76 is provided below the loaded optical disk 72 within the MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure shown in FIG. 3. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 3. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Figure 5:
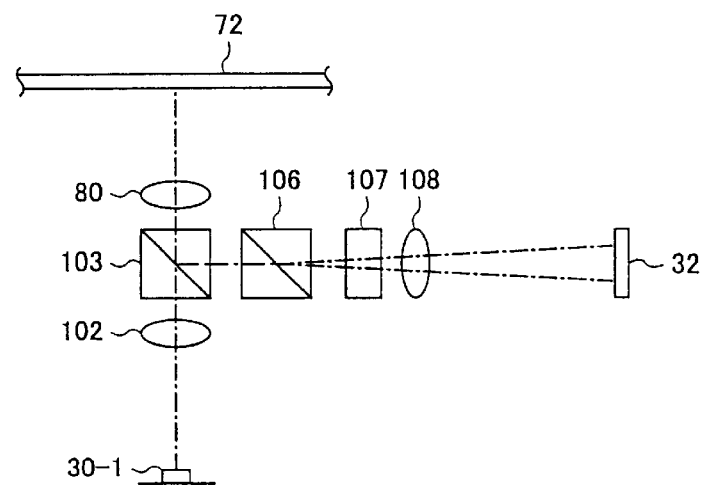
FIG. 5 is a diagram showing an important part of an optical system.

FIG. 5 is a diagram showing an important part of an optical system. In FIG. 5, the illustration of the mirror 82 and the like will be omitted. The light (laser) beam emitted from the laser diode 30-1 is converted into parallel beam by a collimator lens 102, and supplied to a beam splitter 103. The light beam transmitted through the beam splitter 103 is converged on the optical disk 72 via the objective lens 80. The converged light beam is reflected by the optical disk 72 and is supplied again to the beam splitter 103. The light beam supplied to the beam splitter 103 this time is reflected towards a Wollaston prism 106. The light beam which passes through the Wollaston prism 106 is supplied to the ID/MO detector 32 via a composite prism 107 and a condenser lens 108. The collimator lens 102, the beam splitter 103, the Wollaston prism 106, the composite prism 107, the condenser lens 108 and the ID/MO detector 32 are provided within the fixed optical system 78 shown in FIG. 4.

Figure 6:
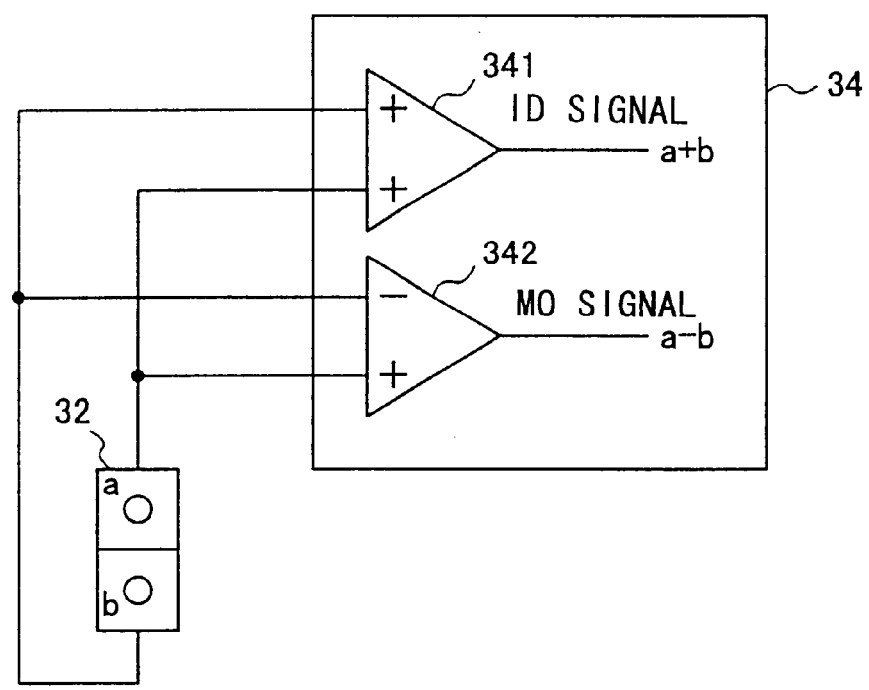
FIG. 6 is a diagram showing a structure of an important part of a head amplifier.

FIG. 6 is a diagram showing a structure of an important part of the head amplifier 34. In FIG. 6, the ID/MO detector 32 is formed by a 2-part photodetector which is made up of photodetector portions a and b, and an adder 341 of the head amplifier 34 outputs the ID signal (embossed pit signal/ optical reproduced signal) by adding output signals a and b of the photodetector portions a and b. On the other hand, a subtracter 342 of the head amplifier 34 outputs the MO signal (magneto-optical signal) by subtracting the output signal b of the photodetector portion b from the output signal a of the photodetector portion a.

Figure 7:
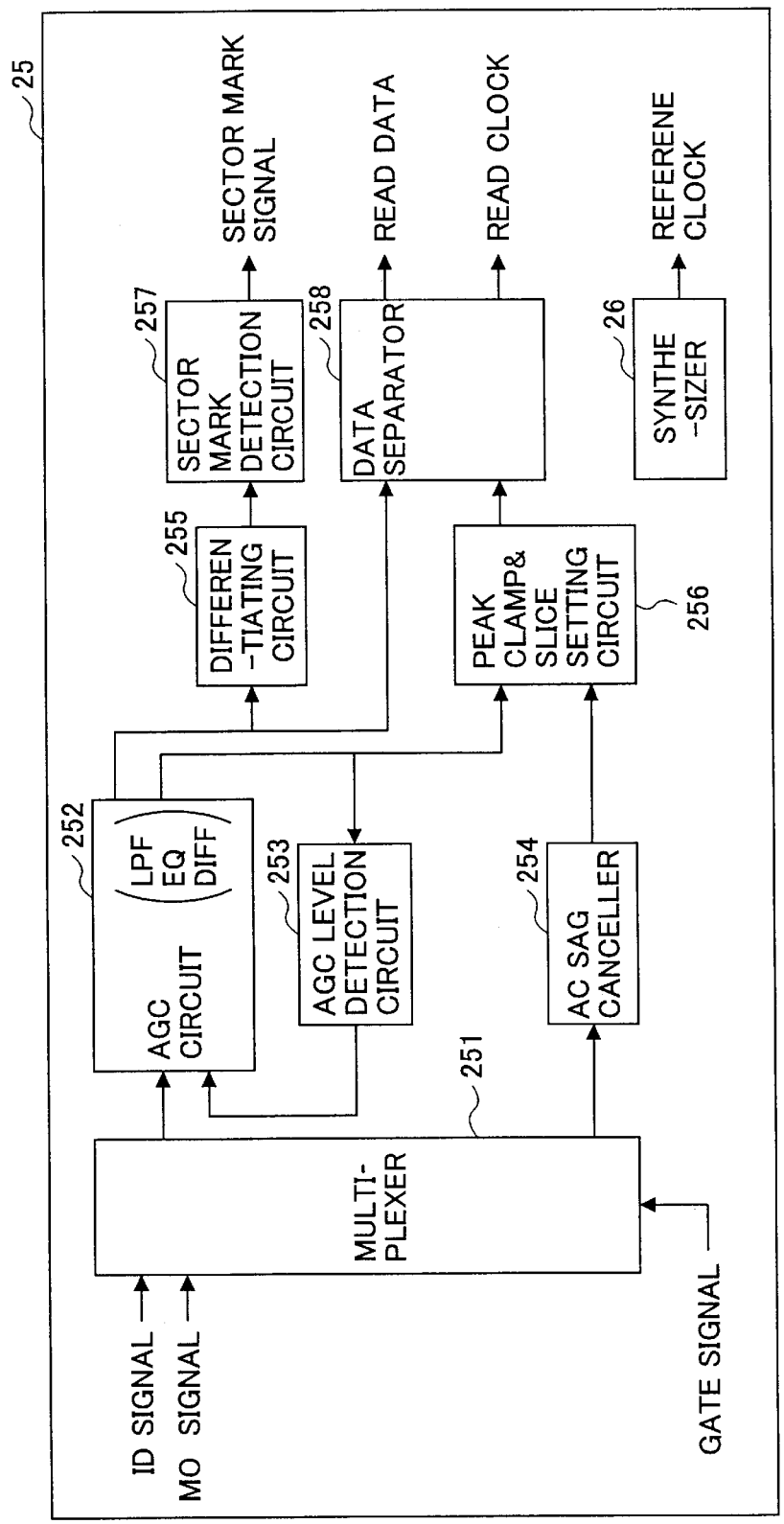
FIG. 7 is a diagram showing a structure of an important part of a read demodulator.

FIG. 7 is a diagram showing a structure of an important part of the read demodulator 25 within the read/write LSI circuit 20. The read demodulator includes a multiplexer 251, an AGC circuit 252, an AGC level detection circuit 253, an AC sag canceller 254, a differentiating circuit 255, a peak clamp and slice setting circuit 256, a sector mark detection circuit 257, a data separator 258 and the frequency synthesizer 26 which are connected as shown in FIG. 25. The frequency synthesizer 26 may of course be separate from the read demodulator 25 as shown in FIG. 3.

The ID signal and the MO signal from the head amplifier 34 are input to the multiplexer 251 which is switched and controlled by a gate signal which is received via the ODC 14, and are output as a single signal. The output signal of the multiplexer 251 is supplied to the AGC circuit 252 which is provided to control the output level constant. This AGC circuit 252 includes the functions of a lowpass filter, an equalizer and a differentiator within a negative feedback loop from the AGC level detection circuit 253. Accordingly, the high-frequency noise is cut off, the frequency characteristic is improved and the low-frequency component is eliminated in the differentiated output which is obtained from the AGC circuit 252.

The output of the AGC circuit 252 is supplied to the sector mark detection circuit 257 via the differentiating circuit 255, and is also supplied to the data separator 258. The sector mark detection circuit 257 detects the sector mark of the header and outputs a sector mark signal, by carrying out an edge detection via the differentiating circuit 255. The data separator 258 also receives, via the AC sag canceller 254 and the peak clamp and slice setting circuit 255, a slice level for binarizing the data. Hence, the data separator 258 outputs a read data and a read clock corresponding to the ID signal and the MO signal, and the data is demodulated based thereon. As described above, the frequency synthesizer 26 generates as the read clock a reproducing reference clock having a peculiar frequency which is predetermined depending on the zone position on the optical disk.

Figure 8:
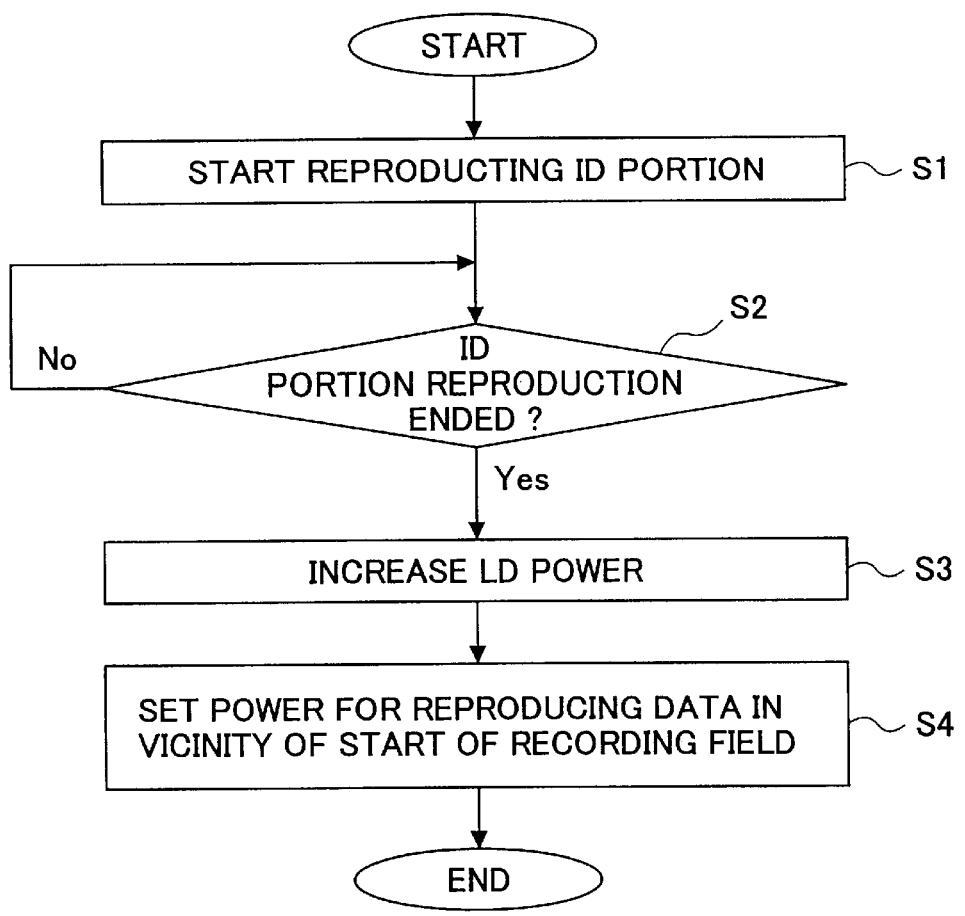
FIG. 8 is a flow chart for explaining a power control operation of the first embodiment.
Figure 9:
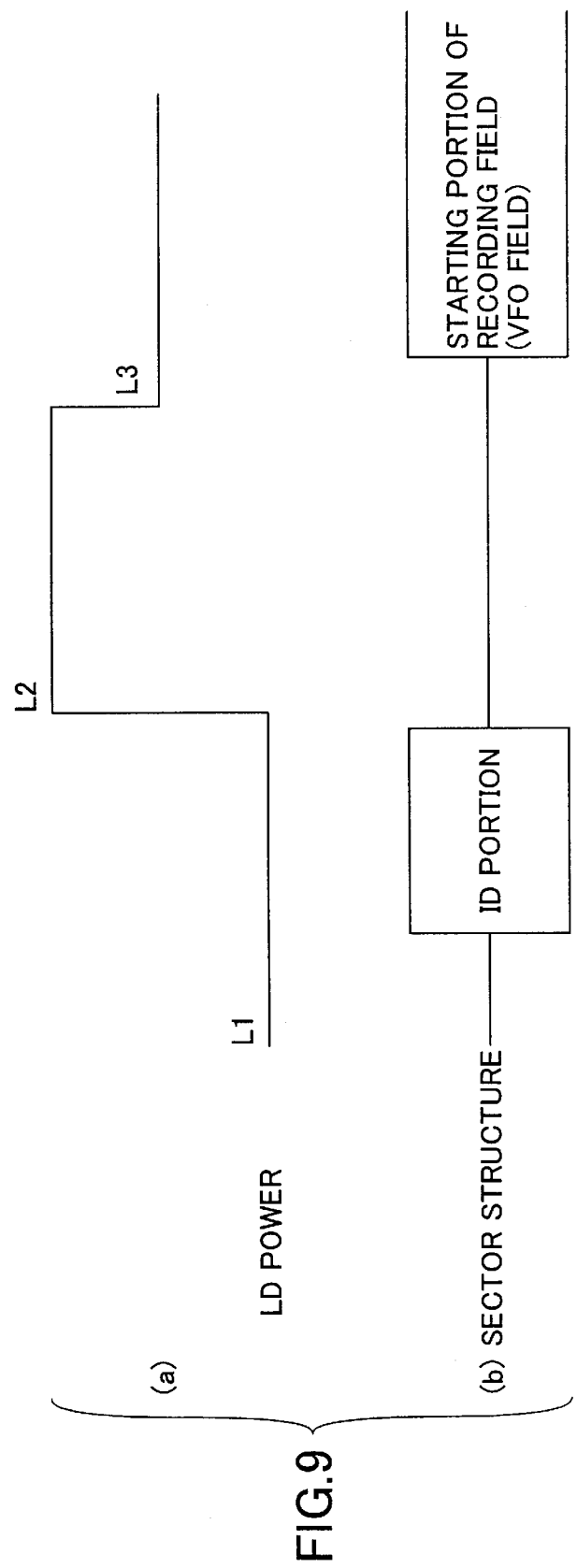
FIG. 9 is a diagram for explaining the LD power at the time of the reproduction in the first embodiment.

Next, a description will be given of a power control operation which controls the power (LD power) of the light beam emitted from the laser diode (LD) 30-1 when the judged type of the loaded recording medium is a high-density recording medium having a storage capacity of 2.3 GB or greater, by referring to FIGS. 8 and 9. In the case of a low-density recording medium having a storage capacity of less than 2.3 GB, the power control operation controls the recording power from the data field without a power-up period. FIG. 8 is a flow chart for explaining the power control operation of this first embodiment, and FIG. 9 is a diagram for explaining the LD power at the time of the reproduction in this first embodiment. In FIG. 9, (a) indicates the LD power, and (b) indicates the ID portion of the header and the data field of the recording field in the zone of the optical disk 72.

The process shown in FIG. 8 is carried out by a firmware or a program of the MPU 12 shown in FIG. 3. In FIG. 8, a step S1 starts reproducing the ID portion of the header shown in FIG. 9(b) with a laser (LD) power L1 shown in FIG. 9(a). A step S2 decides whether or not the reproduction of the ID portion is ended. If the decision result in the step S2 is YES, a step S3 controls the power of the laser diode 30-1 within the laser diode unit 30 via the ODC 14 and the read/write LSI circuit 20, so as to increase the LD power. As a result, the reproduction of the recording field is started at an LD power L2 as shown in FIG. 9(a). In addition, a step S4 decreases the LD power in a vicinity of the data field of the recording field, to an LD power L3 which is sufficient to continue reproducing the data field, and the process ends. The LD powers L1 through L3 described above satisfy a relationship L2>L3>L1.

A time during which the LD power is increased to the LD power L2 is approximately 10 nsec to approximately 30 μsec, for example. In addition, the time during which the LD power is increased to the LD power L2 may be up to the gap portion of the recording field, that is, to a timing before the VFO field of the recording field, for example. The LD power L2 is set to approximately 1.01 times to approximately 2.00 times the LD power L3.

Figure 10:
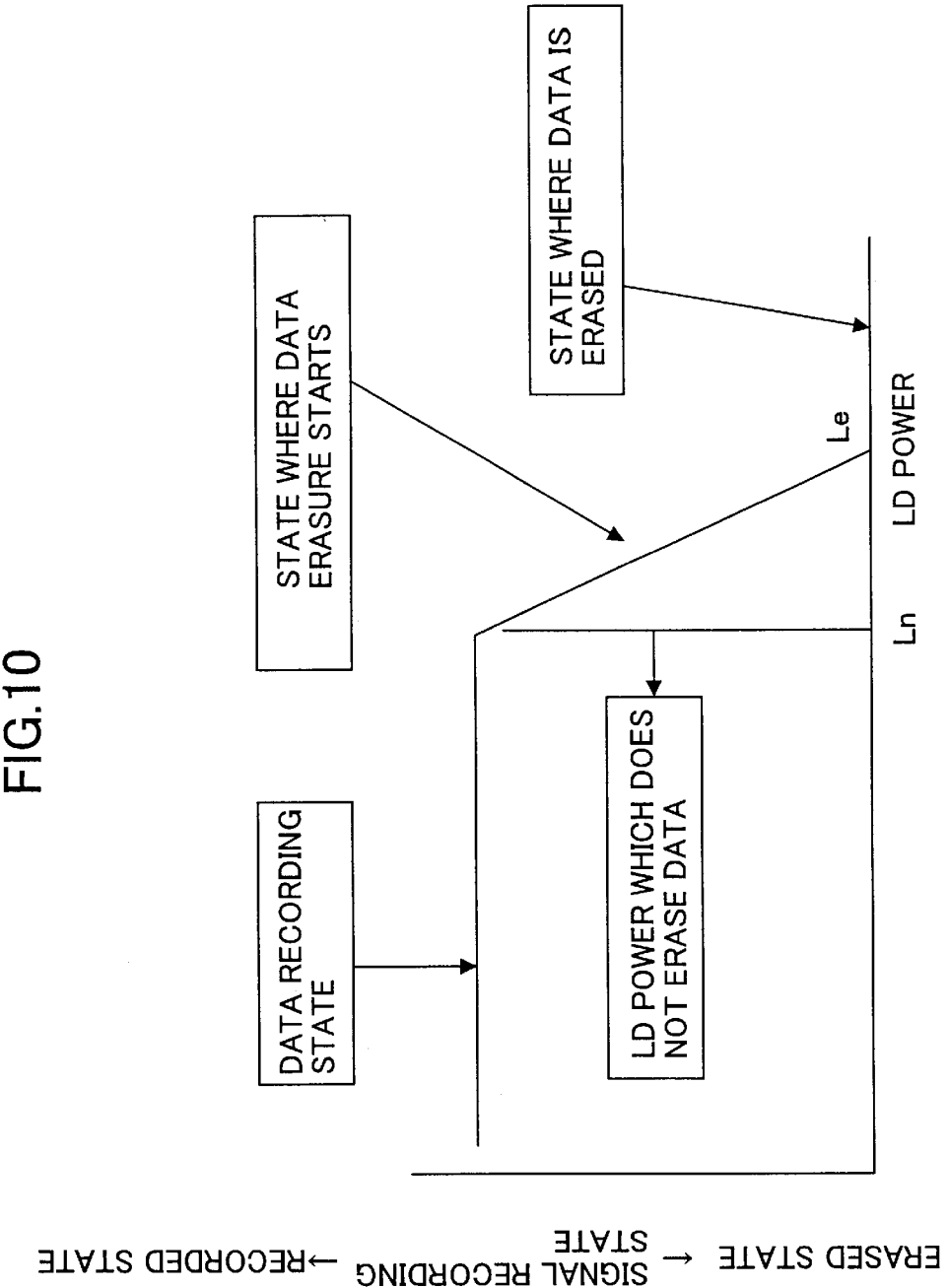
FIG. 10 is a diagram for explaining a range of the LD power in which no data erasure is generated in a first modification.

Next, a description will be given of a first modification of this embodiment, by referring to FIG. 10. FIG. 10 is a diagram for explaining a range of the LD power in which no data erasure is generated in this first modification. In FIG. 10, the ordinate indicates an erased state and a recorded state of the data, and the abscissa indicates the LD power.

As shown in FIG. 10, the recorded state of the data recorded on the optical disk 72 is positively maintained to an LD power Ln. However, when the LD power Ln is exceeded, the recorded state of the recorded data gradually deteriorates, and the recorded data assumes the erased state when an LD power Le is exceeded. Hence, in this first modification, the LD power L2 shown in FIG. 9(a) is set to the LD power Ln or less, that is, to a range in which the erasure of the recorded data does not occur. In this range, the LD power has a value lower than an erase power which is used when erasing the recorded data.

Figure 11:
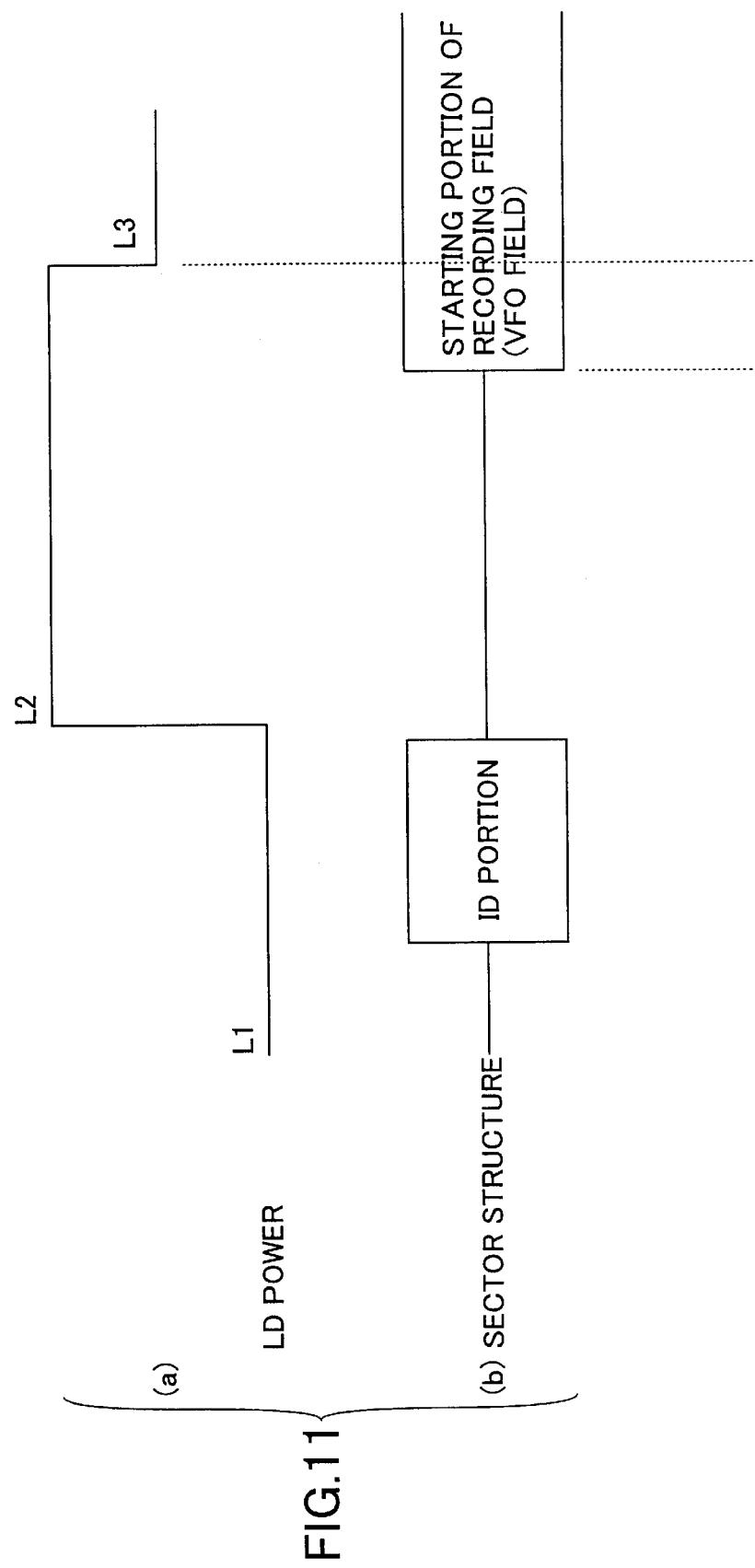
FIG. 11 is a diagram for explaining the LD power at the time of the reproduction in a second modification.

Next, a description will be given of a second modification of this embodiment, by referring to FIG. 11. FIG. 11 is a diagram for explaining the LD power at the time of the reproduction in this second modification. In FIG. 11, those parts which are the same as those corresponding parts in FIG. 9 are designated by the same reference numerals, and a description thereof will be omitted.

In the first embodiment described above, the timing at which the LD power is decreased from the LD power L2 to the LD power L3 is set to a timing before the VFO field of the recording field. But in this second modification, this timing is set to an arbitrary timing which is after the start of the VFO field of the recording field and is before the start of the data field of the recording field.

Figure 12:
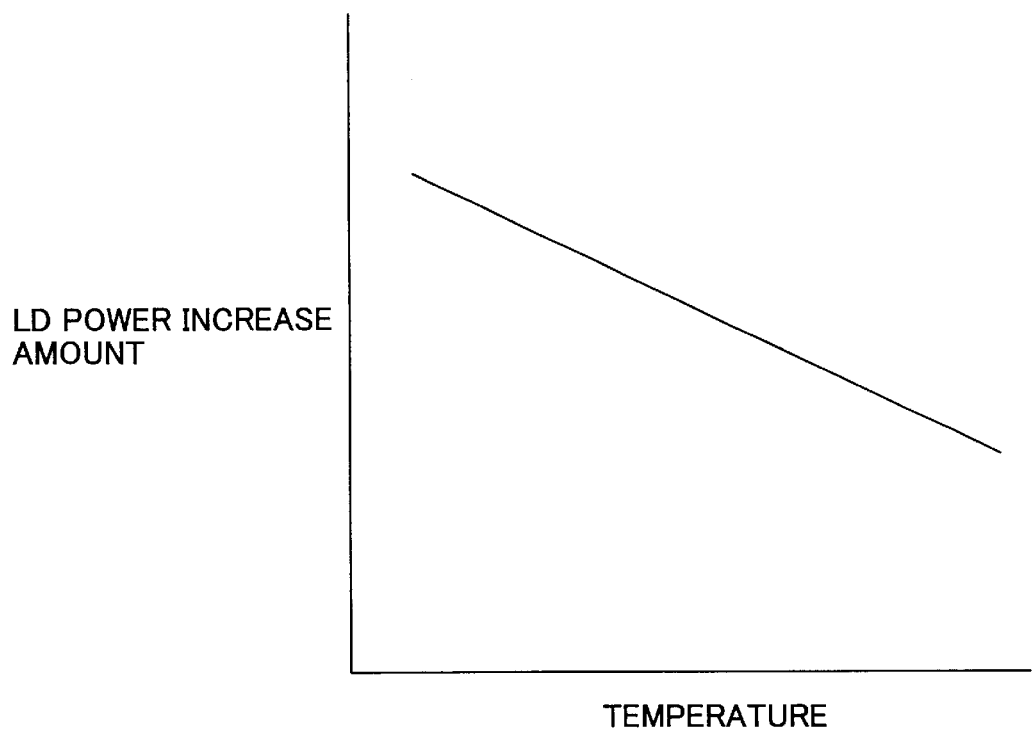
FIG. 12 is a diagram showing a relationship between a LD power increase amount and a temperature in a third modification.

Next, a description will be given of a third modification of this embodiment, by referring to FIG. 12. FIG. 12 is a diagram showing a relationship between a LD power increase amount and a (environmental) temperature in this third modification. In FIG. 12, the ordinate indicates the LD power increase amount, in arbitrary units, for increasing the LD power from the LD power L1 to the LD power L2, and the abscissa indicates the temperature in arbitrary units. The temperature is recognized within the MPU 12 based on the output signal of the temperature sensor 36 shown in FIG. 3.

In other words, this third modification decreases the LD power increase amount as the temperature becomes higher, so as to prevent the LD power L2 from becoming unnecessarily high.

The power values corresponding to the position or temperature may be prestored in a memory such as the memory 18 in the form of a table or, obtained by calculation and set in the laser diode control circuit 22.

Figure 13:
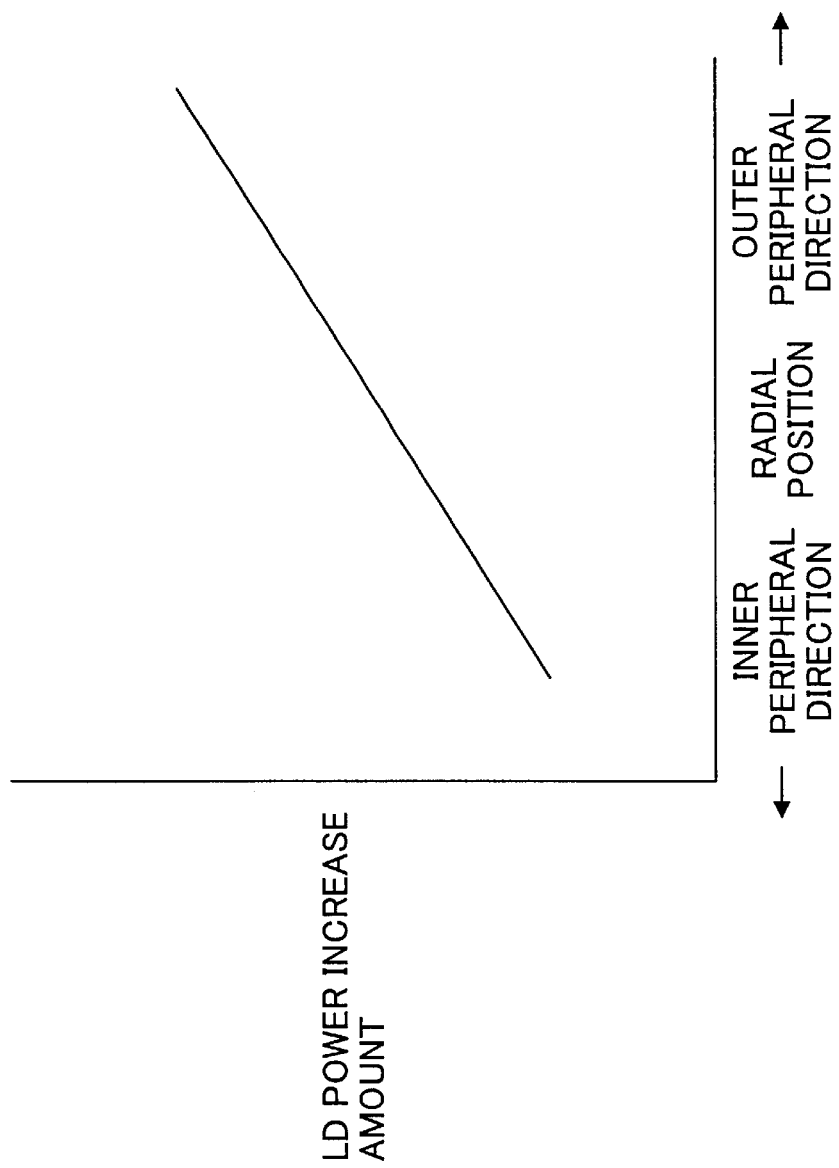
FIG. 13 is a diagram showing a relationship between the LD power increase amount and a radial position on an optical disk in a fourth modification.

Next, a description will be given of a fourth modification of this embodiment, by referring to FIG. 13. FIG. 13 is a diagram showing a relationship between the LD power increase amount and a radial position on the optical disk in this fourth modification. In FIG. 13, the ordinate indicates the LD power increase amount, in arbitrary units, for increasing the LD power from the LD power L1 to the LD power L2, and the abscissa indicates the radial position on the optical disk 72 in arbitrary units. The radial position on the optical disk 72 is recognized by the MPU 12 based on position information which is reproduced from the header.

In other words, this fourth modification increases the LD power increase amount as the radial position on the optical disk 72 moves towards the outer peripheral side of the optical disk 72, so that the LD power L2 is sufficiently high when starting the reproduction of the recording field.

Figure 14:
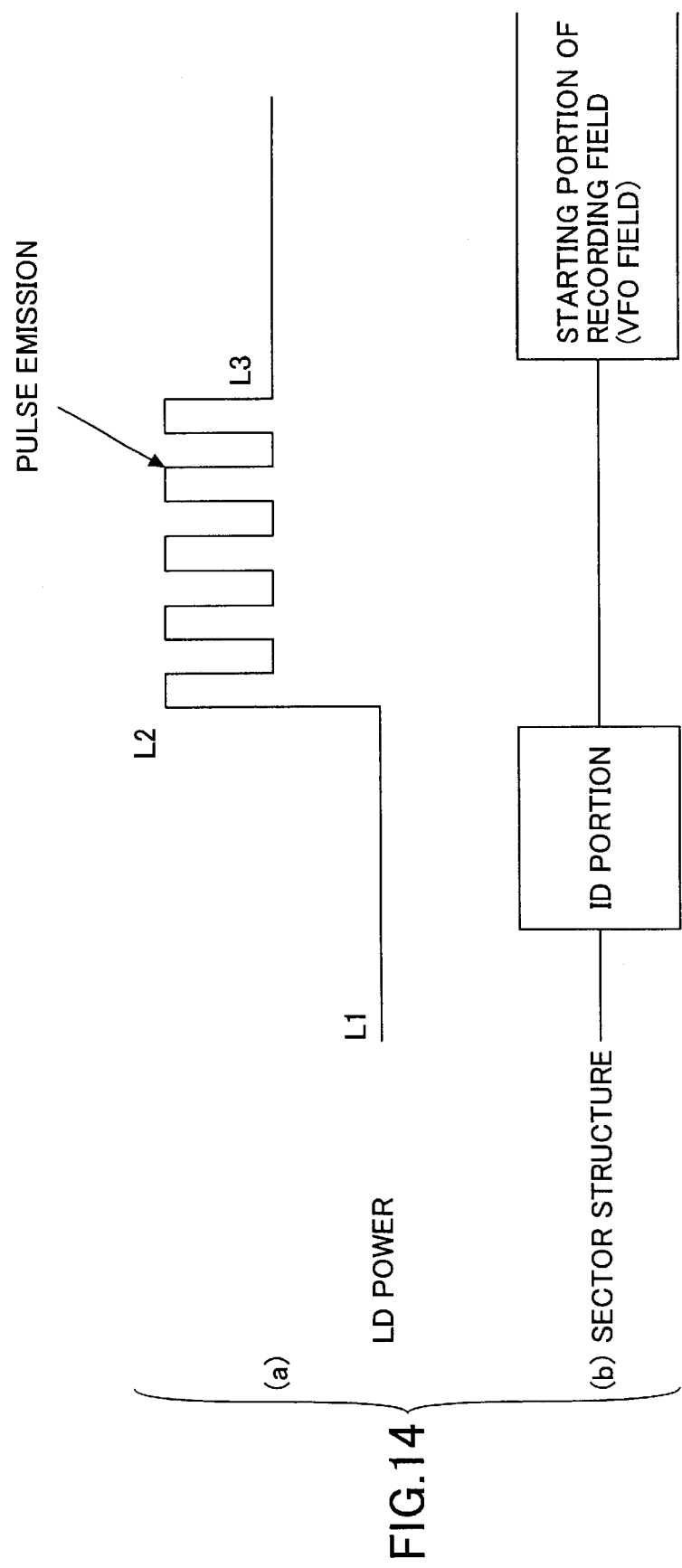
FIG. 14 is a diagram for explaining the LD power at the time of the reproduction in a fifth modification.

Next, a description will be given of a fifth modification of this embodiment, by referring to FIG. 14. FIG. 14 is a diagram for explaining the LD power at the time of the reproduction in this fifth modification. In FIG. 14, those parts which are the same as those corresponding parts in FIG. 9 are designated by the same reference numerals, and a description thereof will be omitted.

In the first embodiment described above, the laser diode 30-1 makes a DC light emission during the time in which the LD power is increased to the LD power L2. On the other hand in this fifth modification, the laser diode 30-1 is caused to make a pulse light emission responsive to a pulse signal which is made up of a plurality of pulses, during the time in which the LD power is increased to the LD power L2. The width and amplitude of each of the pulses are the same in FIG. 14(a), but the width and amplitude may be changed for each of the pulses. Of course, the timing at which the LD power is decreased from the LD power L2 to the LD power L3 may be set to the timing shown in FIG. 11.

Figure 15:
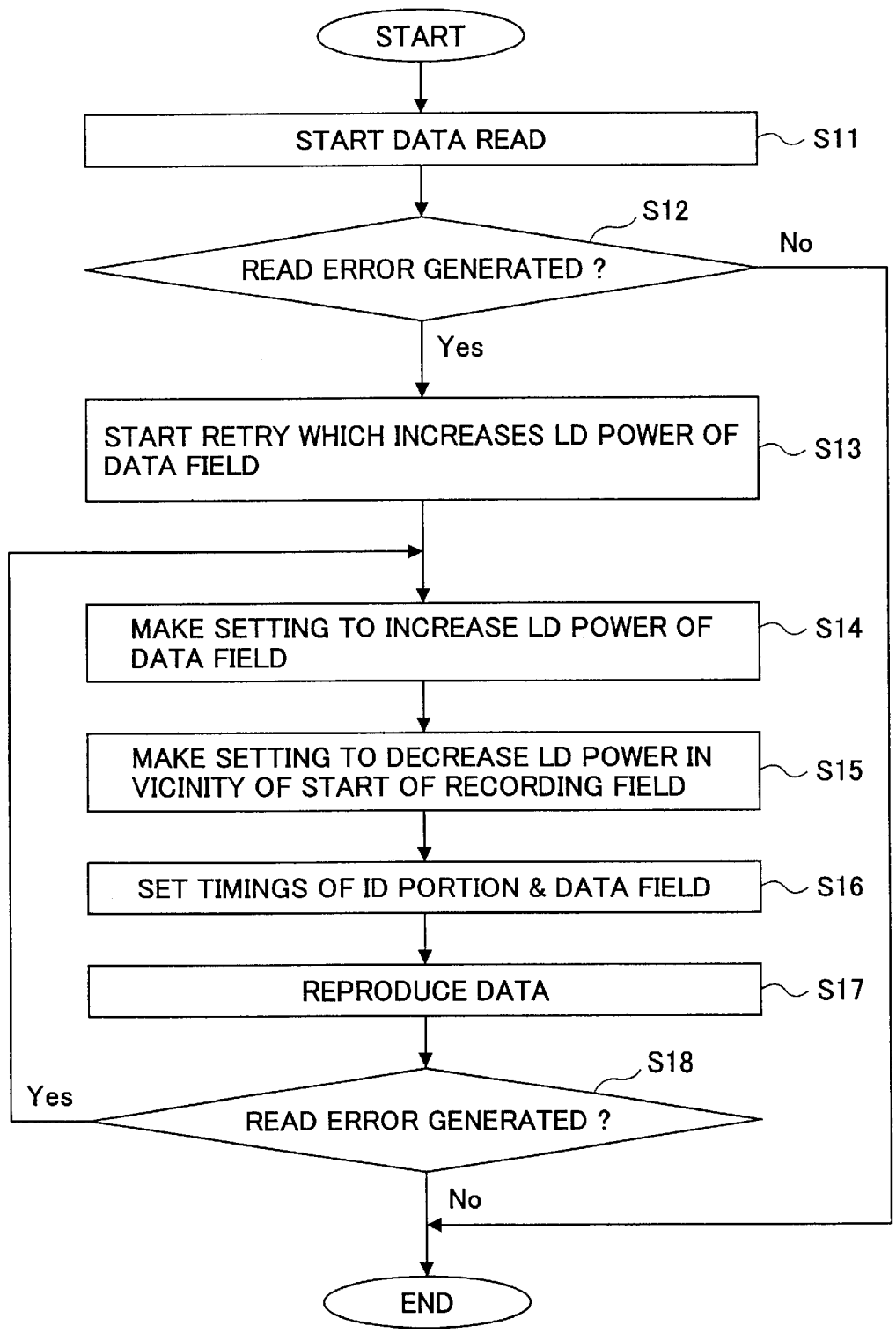
FIG. 15 is a flow chart for explaining the power control operation of a second embodiment of the storage apparatus according to the present invention.

Next, a description will be given of a second embodiment of the storage apparatus according to the present invention, by referring to FIG. 15. FIG. 15 is a flow chart for explaining the power control operation of this second embodiment of the storage apparatus. The process shown in FIG. 15 is carried out by the MPU 12 shown in FIG. 3. In this second embodiment of the storage apparatus, the present invention is applied to an optical disk unit. In addition, this second embodiment of the storage apparatus employs a second embodiment of the reproducing method according to the present invention. Since the basic structure of this second embodiment of the storage apparatus is the same as the basic structure of the first embodiment of the storage apparatus described above, the illustration and description thereof will be omitted.

In this second embodiment, a read retry process is carried out by increasing the LD power L3 of the first embodiment or modifications thereof. In FIG. 15, a step S11 starts a data read, and a step S12 decides whether or not a read error is generated. The process ends if the decision result in the step S12 is NO. On the other hand, if the decision result in the step S12 is YES, a step S13 starts a retry process which increases the LD power L3 which is used when reproducing the data field of the recording field, in order to obtain an optimum LD power for eliminating the error. A step S14 makes a setting to increase the LD power L3, and a step S15 makes a setting to decrease the LD power L2 at a timing before the data field of the recording field. A step S16 makes a timing setting with respect to the header (ID portion) and the recording field (data field), and a step S17 reproduces the data of the data field within the recording field. A step S18 decides whether or not a read error is generated, and the process returns to the step S14 if the decision result in the step S18 is YES. The process ends if the decision result in the step S18 is NO.

Figure 16:
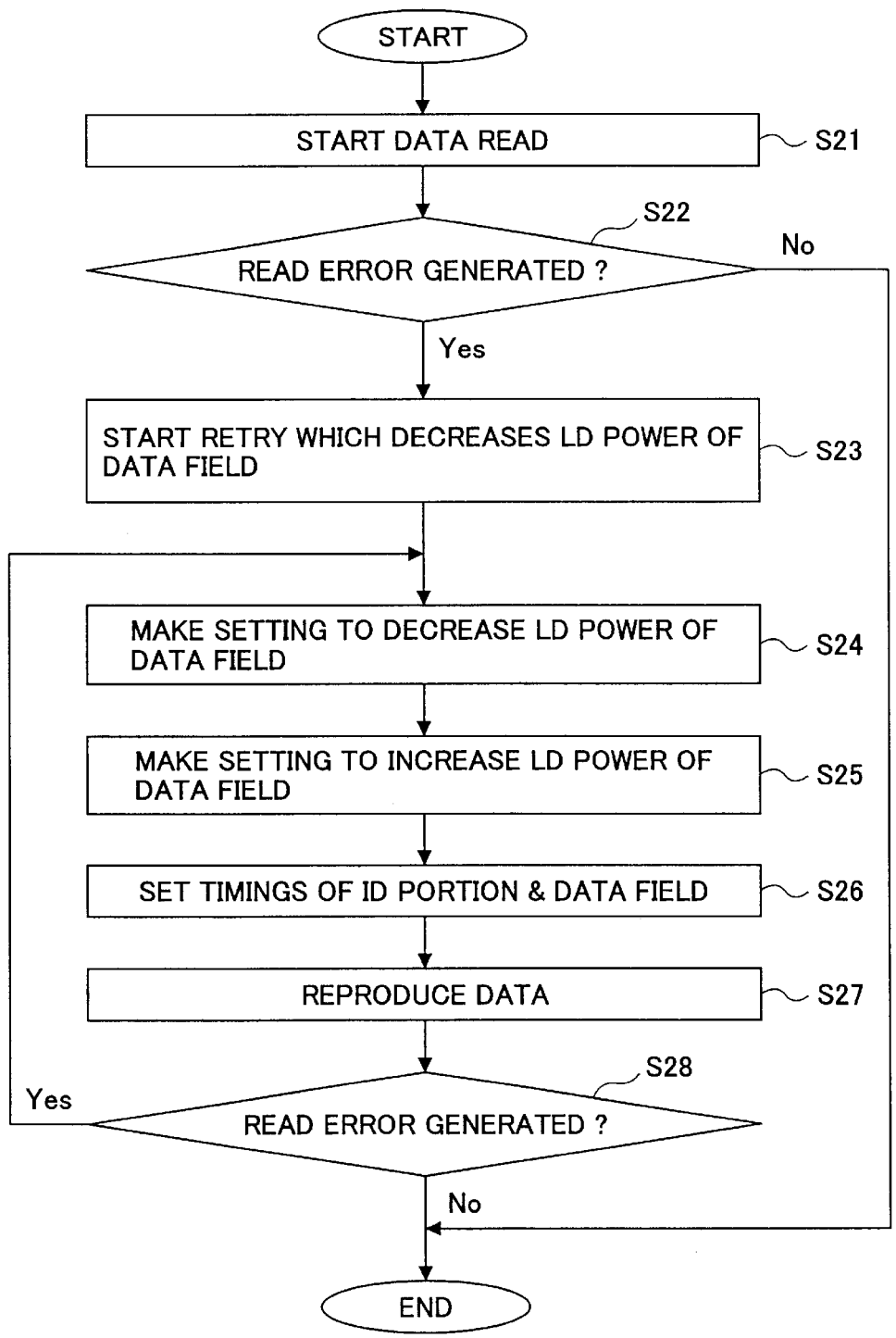
FIG. 16 is a flow chart for explaining the power control operation of a third embodiment of the storage apparatus according to the present invention.

Next, a description will be given of a third embodiment of the storage apparatus according to the present invention, by referring to FIG. 16. FIG. 16 is a flow chart for explaining the power control operation of this third embodiment of the storage apparatus. The process shown in FIG. 16 is carried out by the MPU 12 shown in FIG. 3. In this third embodiment of the storage apparatus, the present invention is applied to an optical disk unit. In addition, this third embodiment of the storage apparatus employs a third embodiment of the reproducing method according to the present invention. Since the basic structure of this third embodiment of the storage apparatus is the same as the basic structure of the first embodiment of the storage apparatus described above, the illustration and description thereof will be omitted.

In this third embodiment, a retry process is carried out by decreasing the LD power L3 of the first embodiment or modifications thereof. In FIG. 16, a step S21 starts a data read, and a step S22 decides whether or not a read error is generated. The process ends if the decision result in the step S22 is NO. On the other hand, if the decision result in the step S22 is YES, a step S23 starts a retry process which decreases the LD power L3 which is used when reproducing the data field of the recording field, in order to obtain an optimum LD power for eliminating the error. A step S24 makes a setting to decrease the LD power L3, and a step S25 makes a setting to increase the LD power L2 at a timing before the data field of the recording field. A step S26 makes a timing setting with respect to the header (ID portion) and the recording field (data field), and a step S27 reproduces the data of the data field within the recording field. A step S28 decides whether or not a read error is generated, and the process returns to the step S24 if the decision result in the step S28 is YES. The process ends if the decision result in the step S28 is NO.

The LD power L3 and the LD power L2 are measured in advance at the factory or at a predetermined timing and stored in the memory such as the memory 18. Thus the LD power L3 and the LD power L2 are read from the memory and set in the laser diode control circuit 22. The optimum power is changed during the retry process described above, but it is possible to adjust the power in a test region by a known test write process to find an optimum power at each radial position and store the optimum power in the memory, so that the optimum power may be read from the memory and set in the laser diode control circuit 22.

Figure 17:
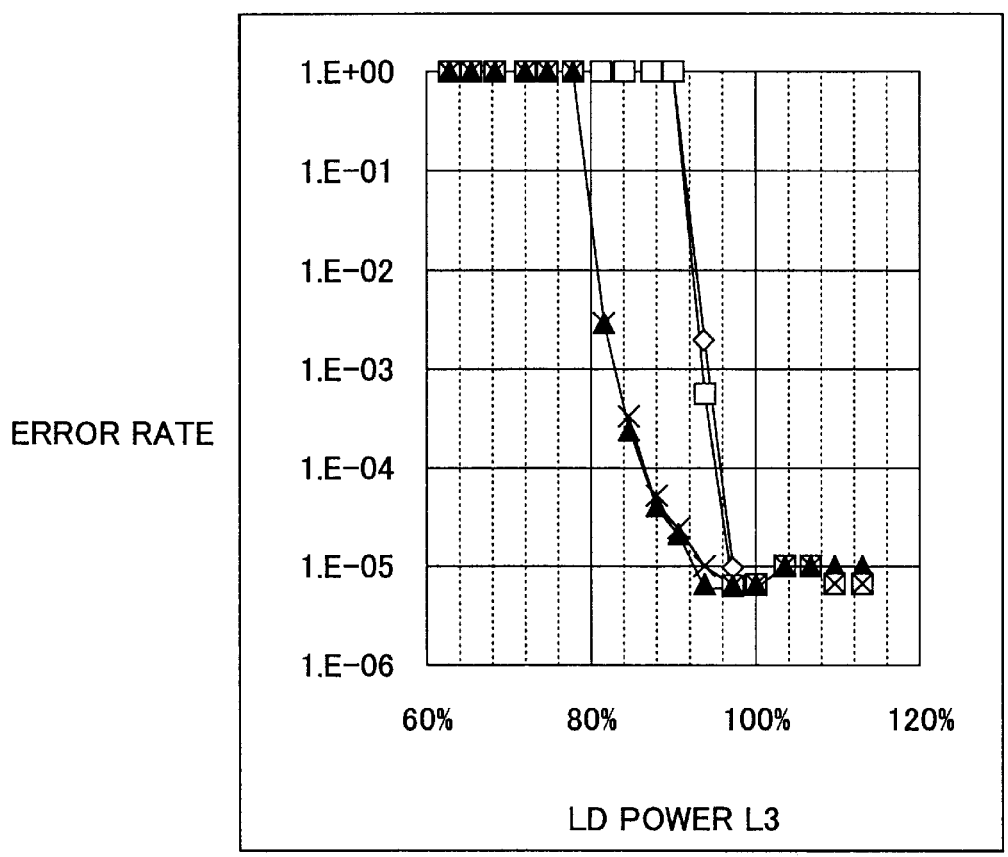
FIG. 17 is a diagram showing a relationship between the LD power and an error rate.

FIG. 17 is a diagram showing a relationship between the LD power and an error rate. In FIG. 17, the ordinate indicates the error rate, and the abscissa indicates the LD power L3 when reproducing the data field of the recording field. Further, a symbol "◊" indicates a case where the LD power L2 when starting the reproduction of the recording field is 1 times the LD power L3, a symbol "€" indicates a case where the LD power L2 when starting the reproduction of the recording field is 1.2 times the LD power L3, a symbol "▲" indicates a case where the LD power L2 when starting the reproduction of the recording field is 1.4 times the LD power L3, a symbol "x" indicates a case where the LD power L2 when starting the reproduction of the recording field is 1.6 times the LD power L3.

In the conventional case described above, when the LD power L2 when starting the reproduction of the recording field is 1 times the LD power L3, it is evident that the error increases when the LD power L3 even slightly decreases from 100% as may be seen from the plots of the symbol "◇" in FIG. 17, and the margin of the LD power is small.

On the other hand, as described in each of the embodiments, if the LD power LD2 when starting the reproduction of the recording field is greater than 1 times the LD power L3, it is evident that the error will not greatly increase as long as the LD power L3 does not decrease below approximately 80%, as may be seen from the plots of the symbols "□", "▲", and "x" in FIG. 17. As a result, it is possible to increase the range of the LD power with which the reproduction is possible, that is, increase the margin of the LD power at the time of the reproduction.

Figure 18:
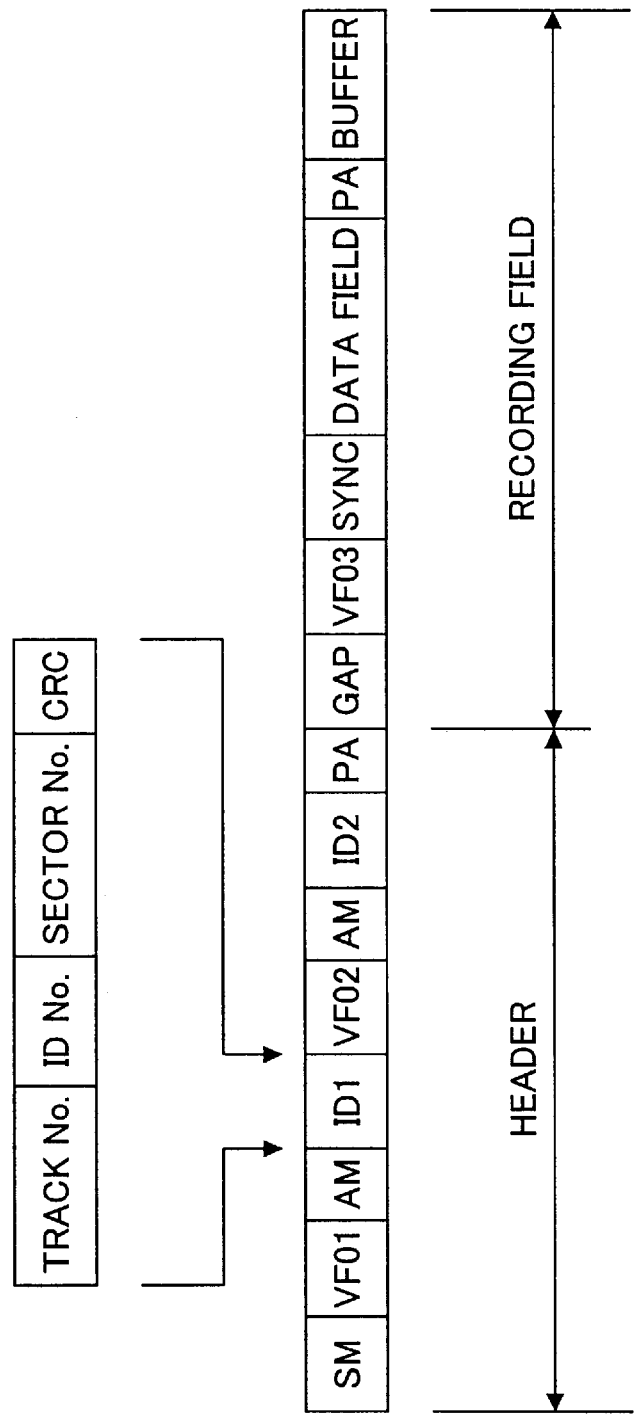
FIG. 18 is a diagram showing a recording format of the optical disk.

FIG. 18 is a diagram showing a recording format of the optical disk 72. Because the recording format itself shown in FIG. 18 is known, a description will only be given with respect to portions which are directly related to the present invention.

In each zone on the optical disk 72 other than the control zone in which the control information is recorded as variations in geometrical configuration such as pits, information is recorded with the recording format shown in FIG. 18 which includes a header and a recording field. The header includes a sector mark SM which indicates a start of a sector, VFO fields VFO1 and VFO2 for PLL phase synchronization and AGC, address marks AM for synchronizing to following ID portions ID1 and ID2, the ID portions ID1 and ID2 which include information for recognizing a sector address, and a postamble PA which indicates an end of the header. The header is recorded as variations in geometrical configuration such as concave or convex pits. For example, the ID portion ID1 includes a track number TRACK No., an ID number ID No., a sector number SECTOR No., and a CRC. On the other hand, the recording field includes a gap portion GAP which indicates a start of the recording field, a VFO field VFO3 for PLL phase synchronization and AGC, a synchronizing portion SYNC for synchronizing to data, a data field DATA FIELD for recording data, a postamble PA, and a buffer portion BUFFER. The recording field is recorded magneto-optically.

In each of the embodiments and modifications described above, the ID portion of the header corresponds to a portion from the ID portion ID1 to the ID portion ID2. Accordingly, the time when the reproduction of the ID portion ends corresponds to a time when the reproduction of the ID portion ID2 ends, but it is of course possible regard the postamble PA of the header as the end of reproduction of the ID portion. On the other hand, in each of the embodiments and modifications described above, the VFO field of the recording field corresponds to the VFO field VFO3 of the recording field. When the power of the light beam is increased at the latter half of the header, it becomes difficult to control the output of the reflected light because this optical reproduction employs the change in the amount of reflected light to reproduce information. Hence, the power of the light beam is increased at the start of the recording field in each of the embodiments and modifications described above.

Furthermore, each of the embodiments and modifications described above takes into consideration the compatibility of the storage apparatus according to the present invention and the conventional storage apparatus. In other words, the functions of the present invention are made not to operate with respect to a low-density recording medium having a storage capacity of less than 2.3 GB, for example. But if the compatibility of the storage apparatus according to the present invention and the conventional storage apparatus does not need to be taken into consideration, the functions of the present invention may be made to operate with respect to the low-density recording medium. In this case, the method of judging the type of recording medium is not limited to the method of judging the type from the pits of the ID portion as described above, and it is possible to employ other methods such as a method which reads media information from a control information region of the recording medium.

Of course, each of the embodiments and modifications described above may be appropriately combined. In addition, the application of the present invention is not limited to the optical disk, and the present invention is similarly applicable to various kinds of optical recording media or magnetic recording media which record information as changes in magneto-optical properties using a light beam.

Further, the present invention is not limited to these embodiments, but various variations and modifications may be made without departing from the scope of the present invention.

What is claimed is:

1. A reproducing method which uses a light beam to reproduce information from a recording medium having an information region with a recording format which includes a header including position information and a recording field including a data field recording data, comprising the step of:
   (a) controlling a power L2 of the light beam in a vicinity of a start of the recording field to become higher than a power L3 at the data field of the recording field and lower than that of an erase power which is required to erase data recorded in the data field; and
   (b) reproducing information from the recording medium by the light beam having the power L2.

2. The reproducing method as claimed in claim 1, wherein said step (a) sets the power L2 to a value which is approximately 1.01 times to approximately 2.00 times that of the power L3.

3. The reproducing method as claimed in claim 1, wherein the recording field includes a gap portion which indicates a start of the recording field, a VFO field for PLL phase synchronization and AGC, a synchronizing portion SYNC for synchronizing to the data, and the data field,
   said step (a) decreasing a power of the light beam from the power L2 to the power L3 at a timing before a start of the VFO field.

4. The reproducing method as claimed in claim 1, wherein the recording field includes a gap portion which indicates a start of the recording field, a VFO field for PLL phase synchronization and AGC, a synchronizing portion SYNC for synchronizing to the data, and the data field,
   said step (a) decreasing a power of the light beam from the power L2 to the power L3 at a timing after a start of the VFO field and before a start of the data field.

5. The reproducing method as claimed in claim 1, further comprising:

(c) detecting a temperature or a position on the recording medium, wherein said step (a) variably sets the power L2 depending on the temperature or the position on the recording medium detected in said step (c).

6. The reproducing method as claimed in claim 1, wherein said step (a) controls a light source of the light beam to make a DC light emission or a pulse light emission during a time in which the light beam is set to the power L2.

7. The reproducing method as claimed in claim 1, wherein said step (a) sets a power of the light beam to a power L1 which is lower than the power L3 when reproducing the header.

8. A storage apparatus which uses a light beam to reproduce information from a recording medium having an information region with a recording format which includes a header including position information and a recording field including a data field for recording data, comprising:

a light source to emit the light beam; and a control section to control a power L2 of the light beam in a vicinity of a start of the recording field to become higher than a power L3 at the data field of the recording field, and so that the power L2 has a value lower than that of an erase power which is required to erase the data recorded in the data field.

9. The storage apparatus as claimed in claim 8, wherein said control section sets the power L2 to a value which is approximately 1.01 times to approximately 2.00 times that of the power L3.

10. The storage apparatus as claimed in claim 8, wherein the recording field includes a gap portion which indicates a start of the recording field, a VFO field for PLL phase synchronization and AGC, a synchronizing portion SYNC for synchronizing to the data, and the data field, said control section decreasing a power of the light beam from the power L2 to the power L3 at a timing before a start of the VFO field.

11. The storage apparatus as claimed in claim 8, wherein the recording field includes a gap portion which indicates a start of the recording field, a VFO field for PLL phase synchronization and AGC, a synchronizing portion SYNC for synchronizing to the data, and the data field, said control section decreasing a power of the light beam from the power L2 to the power L3 at a timing after a start of the VFO field and before a start of the data field.

12. The storage apparatus as claimed in claim 8, further comprising:

a detector to detect a temperature or a position on the recording medium, wherein said control section variably sets the power L2 depending on the temperature or the position on the recording medium detected by said detector.

13. The storage apparatus as claimed in claim 8, wherein said control section controls said light source to make a DC light emission or a pulse light emission during a time in which the light beam is set to the power L2.

14. The storage apparatus as claimed in claim 8, wherein said control section sets a power of the light beam to a power L1 which is lower than the power L3 when reproducing the header.

15. The storage apparatus as claimed in claim 8, further comprising:

a retry control section to carry out a retry process which increases or decreases the power L3.

16. A reproducing method which uses a light beam to reproduce information from a recording medium having an information region with a recording format which includes a header including position information and a recording field including a data field recording data, comprising the step of:

(a) controlling a power L2 of the light beam in a vicinity of a start of the recording field to become higher than a power L3 at the data field of the recording field; and (b) judging a type of the recording medium, said step (a) being carried out when said step (b) judges that the recording medium is a high-density recording medium.

17. The reproducing method as claimed in claim 16, wherein said step (a) sets the power L2 to a value which is lower than that of an erase power which is required to erase the data recorded in the data field.

18. A reproducing method which uses a light beam to reproduce information from a recording medium having an information region with a recording format which includes a header including position information and a recording field including a data field recording data, comprising the step of:

(a) controlling a power L2 of the light beam in a vicinity of a start of the recording field to become higher than a power L3 at the data field of the recording field; and (b) detecting an irradiating time of the light beam, wherein said step (a) maintains the power L2 for approximately 10 nsec to approximately $30\mu$ sec before decreasing a power of the light beam to the power L3, based on the irradiating time detected in said step (b).

19. A storage apparatus which uses a light beam to reproduce information from a recording medium having an information region with a recording format which includes a header including position information and a recording field including a data field for recording data, comprising:

a light source to emit the light beam;

a control section to control a power L2 of the light beam in a vicinity of a start of the recording field to become higher than a power L3 at the data field of the recording field; and a judging section judging a type of the recording medium, said control section controlling the power L2 when said judging section judges that the recording medium is a high-density recording medium.

20. The storage apparatus as claimed in claim 19, wherein said control section sets the power L2 to a value which is lower than that of an erase power which is required to erase the data recorded in the data field.

* * * * *